United States Patent [19]

Kim

[11] Patent Number: 5,187,577
[45] Date of Patent: Feb. 16, 1993

[54] CIRCUIT FOR ELIMINATING GHOST NOISE IN IMAGE PROCESSING SYSTEM

[75] Inventor: Gi-Beom Kim, Seoul, Rep. of Korea

[73] Assignee: Samsung Electronics Co., Ltd., Kyungki, Rep. of Korea

[21] Appl. No.: 846,712

[22] Filed: Mar. 6, 1992

[30] Foreign Application Priority Data

Apr. 12, 1991 [KR] Rep. of Korea .................. 5845

[51] Int. Cl.$^5$ ............................................. H04N 5/27
[52] U.S. Cl. .................................... 358/167; 358/905
[58] Field of Search ............... 358/166, 167, 160, 905, 358/187

[56] References Cited

U.S. PATENT DOCUMENTS 4,542,408  9/1985  Lewis, Jr. .................. 358/905 X
5,055,929  10/1991 Sakai ........................... 358/905 X Primary Examiner—Victor R. Kostak
Attorney, Agent, or Firm—Robert E. Bushnell

[57] ABSTRACT

A circuit for eliminating a ghost noise of an image processing system in transmitting an image signal, wherein an image data and a noise are separated from each other visually and the ghost noise added during transmitting is changed to a white noise so as to reduce an extent of deterioration of a picture quality because a pattern of a data scrambled at each frame is changed by an initial value being different at each frame.

6 Claims, 3 Drawing Sheets

CIRCUIT FOR ELIMINATING GHOST NOISE IN IMAGE PROCESSING SYSTEM

BACKGROUND OF THE INVENTION

The present invention relates to a noise eliminating circuit in an image processing system, and more particularly to a circuit for eliminating ghost noise generated in transmitting an image signal of an advanced television (ATV).

Generally a ghost noise which is added in transmitting an image signal caused by high rise buildings or high mountains, results in deteriorating a picture quality and generating a multiple image, in an ATV of U.S.A type aiming at an image signal transmission through a ground channel.

Conventionally a data is scrambled in two dimension in order to eliminate the ghost noise. The picture quality, however, is deteriorated visually, and more severely in a high frequency component such as an edge portion because the ghost noise changed into a white noise is fixed always in a still image.

SUMMARY OF THE INVENTION

An object of this invention is to provide a circuit for eliminating a ghost noise by scrambling differently each frame of an image signal.

Another object of this invention is to provide a circuit for preventing a deterioration of picture quality by separating a noise from an image through scrambling differently each frame of an image signal.

According to the present invention, a circuit for eliminating a ghost noise in an image processing system comprises:

(a) an address generator part for generating a first and second address signals representing alternately and complementarily a sequential address signal and a pseudo random address signal;

(b) a frame memory part receiving an image signal, for writing the input image signal in sequence and for reading the written image signal at random, according to a reading/writing control signal and the first and second address signals transmitted from the address generator part;

(c) a frame index pulse generator means for receiving a horizontal synchronization signal b and for generating the reading/writing control signal and a frame index pulse used in classifying a frame;

(d) an initial value generator receiving the frame index pulse from the frame index pulse generator, for establishing a plurality of initial values each being different at each frame and for transmitting the established value to the address generator part; and (e) a data generator part receiving the image signal read at the frame memory part, for shaping the read image signal by the reading/writing control signal transmitted from the frame index pulse generator.

BRIEF DESCRIPTION OF THE DRAWINGS

The features and advantages of the circuit according to the present invention will be understood from the following description taken in conjunction with the accompanying drawings in which.

DETAILED DESCRIPTION OF THE PREFERRED EMBODIMENTS

Figure 1:
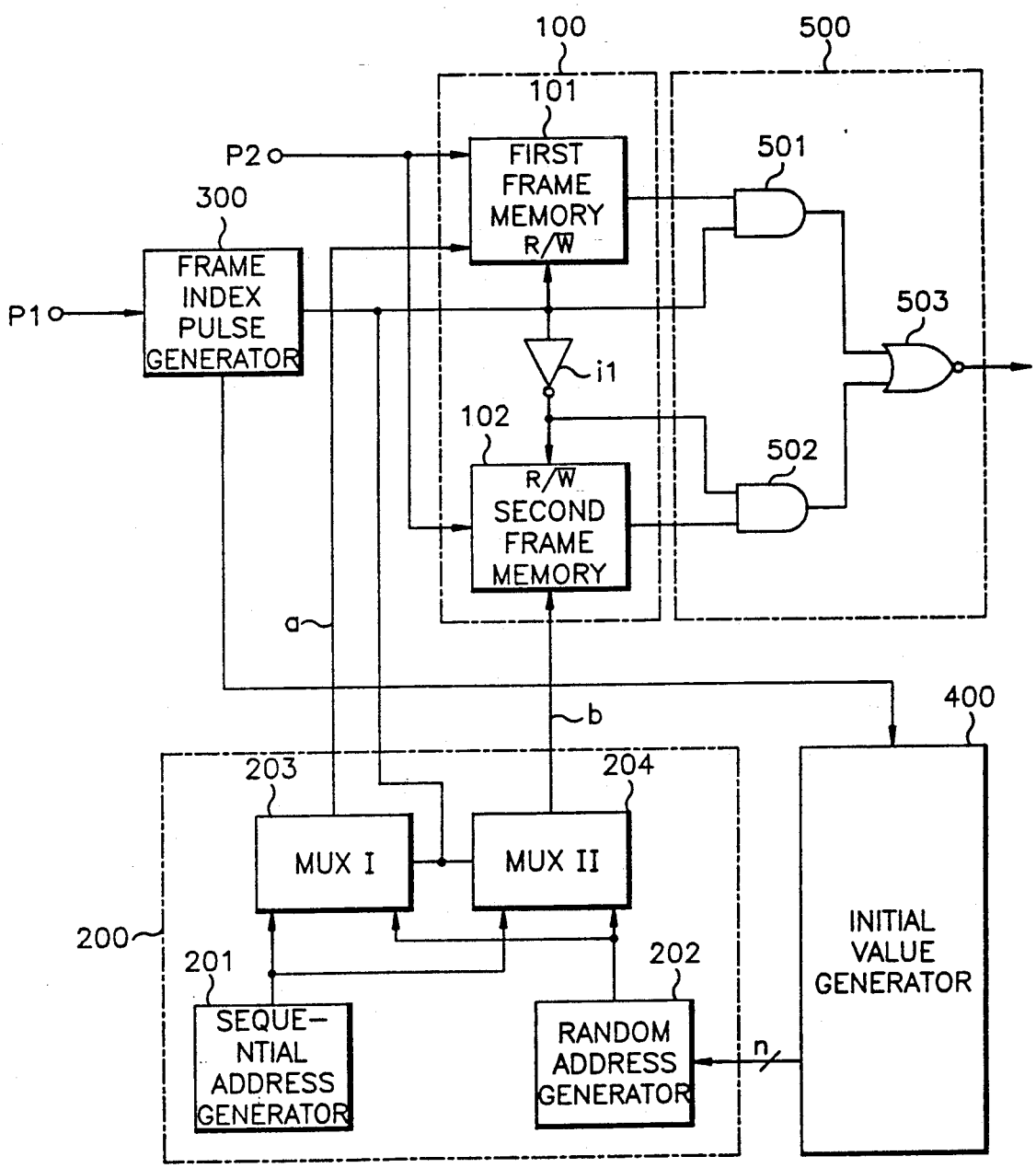
FIG. 1 is a circuit according to the present invention.

With reference to FIG. 1, an address generator part 200 produces a first and second address signals a,b which represent alternately and complementarily a sequential address signal and a pseudo random address signal.

A frame memory part 100 receives an image signal and writes the input image signal in sequence and reads the written image signal at random, according to the first and second address signals a, b received from the address generator part 200 and a reading/writing control signal.

A frame index pulse generator 300 receives a horizontal synchronization signal and generates the reading/writing control signal and a frame index pulse for classifying frame, the reading/writing control signal being applied to the frame memory part 100 and the address generator part 200.

An initial value generator 400 receives the frame index pulse from the frame index pulse generator 300 to produce a plurality of initial values, each being different at each frame, transmitting to the address generator part 200.

A data generator part 500 shapes the image signal which is read at the frame memory part 100, dependent upon the reading/writing control signal from the frame index pulse generator 300.

The frame memory part 100 comprises two frame memories 101, 102. The input image signal is written into a first frame memory 101 in sequence in dependence upon the first address signal a and the reading/writing control signal when the first address signal a is the sequential address signal, the image signal written in the first frame memory being a first image signal. The first image signal is read out at random by the control of the first address signal a and the reading/writing control signal when the first address signal a is the random address signal.

The function of a second frame memory 102 is similar to that of the first frame memory 101. The input signal is written into a second frame memory 102 in sequence in dependence upon the second address signal b and the inverted reading/writing control signal when the second address signal b is generated as the sequential address signal, the image signal written in the second frame memory being a second image signal. The second image signal is read out at random by the control of the second address signal a and the inverted reading/writing control signal when the second address signal b is the random address signal.

The address generator part 200 comprises a sequential address generator 201 and a random address generator 202, and a generator 201 is for transmitting a sequential address signal, produced in a period of one frame, and for delaying a horizontal synchronization signal. The pseudo random address generator 202 receives the delayed horizontal synchronization signal from the sequential address generator 201, to thereby produce a pseudo random address signal in a period of one frame. The first and second MUX 203, 204 generate a first and second address signals a,b by selecting the sequential address signal or the pseudo random address signal.

The data generator part 500 comprises three logical gates 501, 502, 503. A first logical gate 501 receives the first image signal from the first frame memory 101 and the reading control signal from the frame index pulse generator 300, shaping the first image signal. A second logical gate 502 shapes the second image signal by receiving the second image signal from the second memory 102 and the inverted reading control signal of the frame index pulse generator 300. A third logical gate 503 is for inverting the first and second image signals shaped by the first and second logical gates 501, 502.

Figure 2:
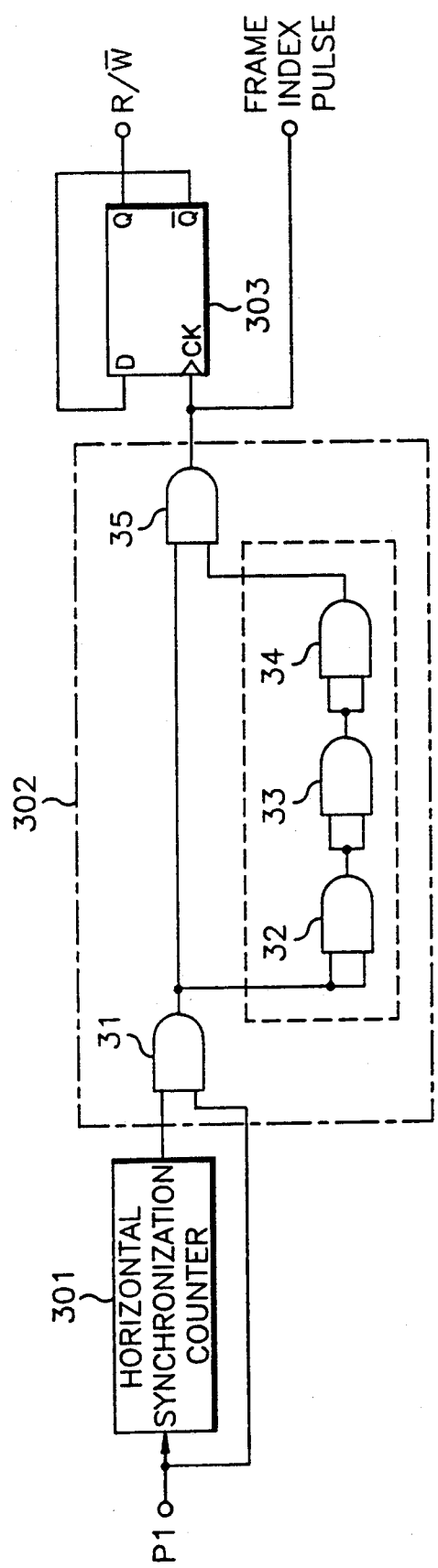
FIG. 2 is a circuit of a frame index pulse generator as shown in FIG. 1.

With reference to FIG. 2, the frame index pulse generator 300 comprises a horizontal synchronization counter 301, a waveform shaper 302, and a D type flip-flop 303. The horizontal synchronization counter 301 receives a horizontal synchronization signal and counts the horizontal synchronization signal in one frame time, thus producing a carry signal. The waveform shaper 302 receives and shapes the horizontal synchronization signal and the carry signal which is from the horizontal synchronization counter 301, so as to produce a frame index pulse having reduced width in comparison with the horizontal synchronization signal. The D flip-flop 303 receives the frame index pulse shaped at the waveform shaper 302 through its clock end, and generates the reading/writing control signal.

Figure 3:
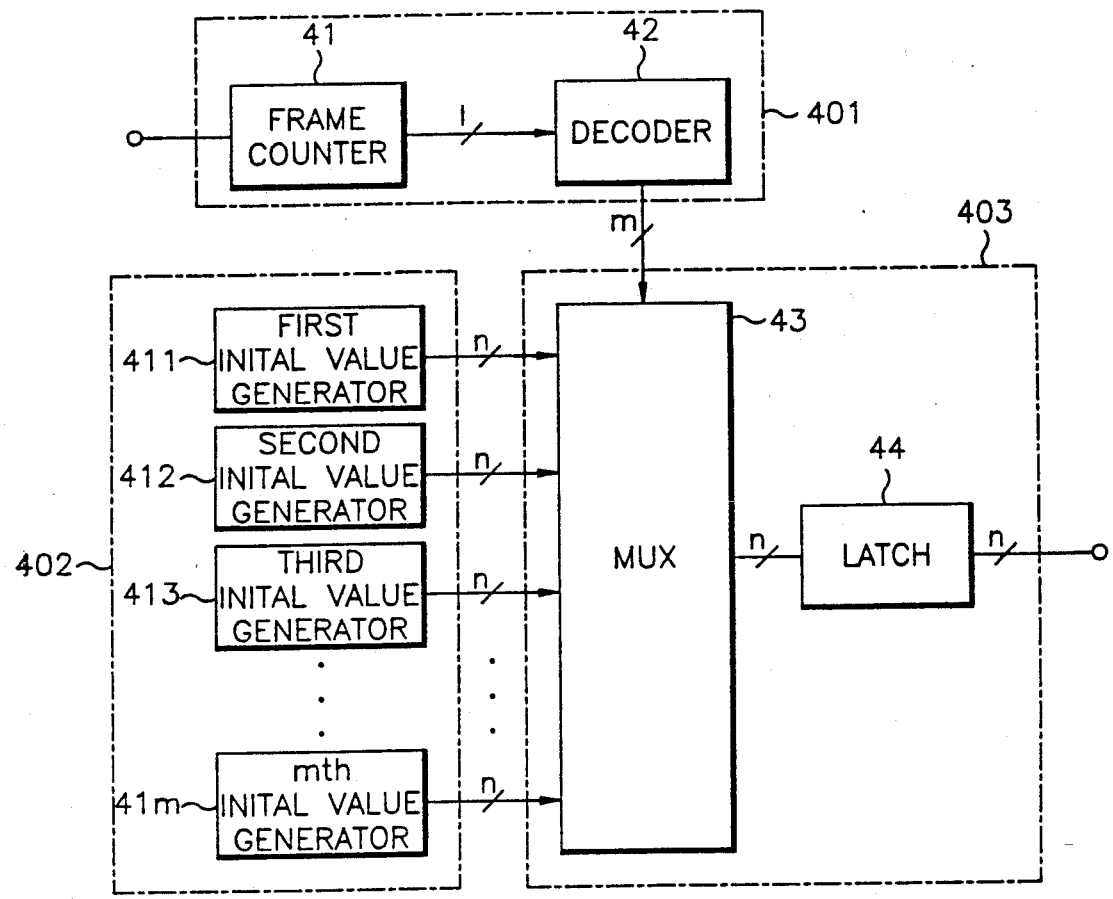
FIG. 3 is a circuit of an initial value generator as shown in FIG. 1.

With reference to FIG. 3, the initial value generator 400 comprises a frame counter 41, a decoder 42, a multiplexor 43, first to mth initial value setters 411 to 41m, and a latch 44. The frame counter 41 receives the shaped frame index pulse and counts the frame numbers. The decoder 42 is for decoding a count-value at the frame counter 41. The first to mth initial value setters 41l to 41m are for generating m initial values, respectively. The multiplexor (MUX) 43 receives m initial values from the first to mth initial value setters 41l-1m, to select a given initial value in dependence upon a decoding value from the decoder 42. The latch 44 is for latching the initial value selected at the MUX 43.

An embodiment of this invention is described more specifically with reference to FIGS. 1 to 4.

The frame index pulse generator 300 receives the horizontal synchronization signal, and generates the reading/writing control signal being applied to the first and second frame memories 101, 102 and a frame index pulse having a reduced width in comparison with the width of the input signal.

With reference to FIG. 2, the horizontal synchronization counter 301 receives the horizontal synchronization signal through the input end P1 and counts the input signal in one frame time, with the result that a carry signal is produced. AND gate 31 receives the carry signal from the horizontal synchronization counter 301 and the horizontal synchronization signal, to generates a pulse of which width is as same as that of the horizontal synchronization pulse by synchronizing with the horizontal synchronizing signal.

The pulse of which width is as same as that of the horizontal synchronization signal, is delayed through the three AND gates 32 to 34.

AND gate 35 generates a frame index pulse having a narrow width for each frame by a logical multiplication of the pulse from the AND gate 31 and the delayed signal from the three AND gates 32 to 34, which is applied to the initial value generator 400.

The D flip-flop 303 receives the frame index pulse from the AND gate 35 at its clock end CK, and generates a reading/writing control signal into the frame memory part 100, the reading/writing control signal being logical "high" level during one frame time and being logical "low" level during the next frame time.

The initial value generator 400, receiving the frame index pulse from the AND gate 35, selects a given initial value among m initial values each being different from one another at each frame.

With reference to FIG. 3, the frame counter 41 receiving the frame index pulse from the AND gate 35 counts a number of frames repeatedly by a m value of 1 bits. The decoder 42 decodes a counting value generated from the frame counter 41 and converts the value into m signals. For example, 16 (2') signals are generated by the decoder 42 if an output signal of the frame counter 41 is 4 bits (l=4, m=16). Order of frame is sensed by the output of the decoder 42 in accordance with the frame index pulse received from the frame index pulse generator 300.

The initial value setter part 402 comprises m initial value setters 41l to 41m, which apply respectively established initial value to the MUX 43. The MUX 43 selects one of the m initial values for each frame according to an output value of the decoder 42. The selected initial value is transmitted to the latch 44 which synchronizes the timing of the selected value and transmits the latched signal to the address generator part 200.

The address generator part 200 produces a first and second address signals a,b which represent alternately and complementarily a sequential address signal and a pseudo random address signal, which is applied to the frame memory part 100. The first address signal a is supplied to the first frame memory 101, and the second address signal b is supplied to the second frame memory 102. The image data is supplied through a data input end P2 to the first and second memories 101, 102. The reading/writing control signal is supplied from the frame index pulse generator 300 to the first frame memory 101. The inverted reading/writing control signal through the inverter I1 is supplied to the second frame memory 102. With the result that the first and second frame memories 101, 102 operate alternatively and complementarily to each other in reading and writing data. That is, the first frame memory 101 is in writing operation while the second frame memory 102 is in the reading operation, and the first and second frame memories 101, 102 write in sequence and read at random in a period of one frame, so that the input image data is arranged randomly at a time base in an unit of one frame. The signals read out of the first and second frame memories 101, 102 are applied to the first and second logical gates 501, 502.

The first and second logical gates 501, 501 generate a scrambled image data by shaping a waveform of the signal, the signal being read from the first and second frame memories 101, 102, by the control of a reading control signal of the frame second logical gates 501, 502 are inverted through the third logical gate 503.

Figure 4:
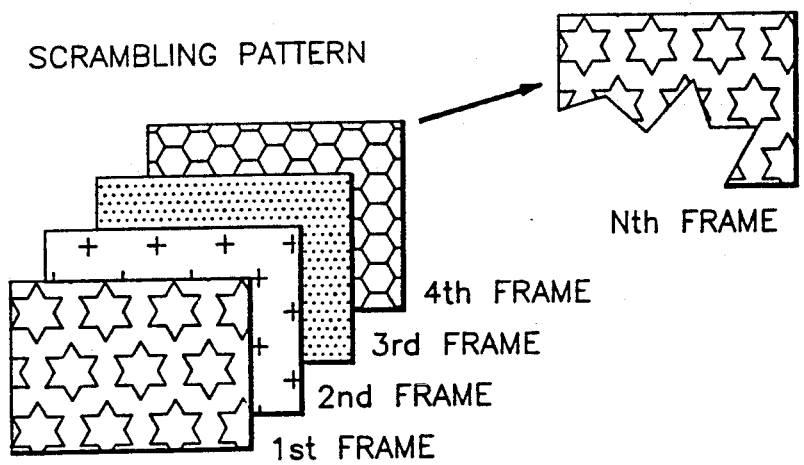
FIG. 4 is a view of pattern of a data scrambled at each frame.

Accordingly, order of the digital image data read from the first and second frame memories 101, 102 are changed at each frame because the random address signal for each frame is changed according to the initial value of the initial value generator 400. Consequently, the pattern of the scrambled digital image data from the third logical gate 503 is changed at each frame as shown in FIG. 4. The image data is reproduced completely at a given position by descrambling the scrambled image data. And the ghost noise added before descrambling is turned to a white noise so that the position of the white noise is changed at each frame, and accordingly the noise and the image data are separated from each other visually so as to decrease the degree of deterioration of picture quality.

An operation of the address generator part 200 and the frame memory part 100 is omitted as it is described in the Korean patent application No. 90-18064.

In conclusion, the noise is separated from the image data visually so as to reduce a deterioration of picture quality, and is secured an image of quality at a high frequency component such as an edge of image because a position of the ghost noise is changed at each frame in transmitting an image signal.

Although the particular embodiment of the present invention has been shown and described, it will be obvious to those skilled in the art that various changes and modifications may be made without departing from the spirit and scope of the present invention.

As will be understood from the foregoing description, the circuit for eliminating a ghost noise according to the present invention is advantageous over the prior art circuit corresponding thereto because of the different scramble for the each frame.

What is claimed is:

1. A circuit for eliminating a ghost noise in an image processing system, comprising:
    address generator means for generating first and second address signals representing alternatively and complementarily a sequential address signal and a pseudo random address signal;
    frame memory means receiving an image signal, for writing said image signal in sequence and for reading the written image signal at random, according to said first and second address signals being transmitted from said address generator means and a reading/writing control signal;
    frame index pulse generator means receiving a horizontal synchronization signal, for generating said reading/writing control signal and a frame index pulse used for classifying a frame;
    initial value generator means receiving said frame index pulse from said frame index pulse generator means, for establishing a plurality of initial values each being different at each frame and for transmitting respective initial value to said address generator means; and
    data generator means receiving image signal read out at said frame memory means, for shaping the read image signal by said reading/writing control signal transmitted from said frame index pulse generator means.

2. A circuit as claimed in claim 1, wherein said frame index pulse generator means comprises:
    horizontal synchronization counter means receiving said horizontal synchronization signal, for counting said horizontal synchronization signal in one frame and for generating a carry signal;
    waveform shaper means for receiving and shaping said horizontal synchronization signal and said carry signal, to thereby generating said frame index pulse, said frame index pulse having reduced width in comparison with the pulse width of said horizontal synchronization signal; and
    flip-flop means receiving said frame index pulse shaped at said waveform shaper means through a clock end thereof, for generating said reading/writing control signal.

3. A circuit as claimed in claim 1, wherein said initial value generator means comprises:
    initial value selection signal generator means receiving said frame index pulse, for producing an initial value selection control signal used for selecting a given initial value corresponding to each frame;
    initial value setter means for establishing a plurality of initial values each being different at each frame; and
    initial value selector means for selectively transmitting the selected initial value being established for each frame in dependence upon said control signal generated at said initial value selection signal setter means.

4. A circuit as claimed in claim 3, wherein said initial value selection signal generator means comprises:
    frame counter means receiving said frame index pulse, for counting a number of frames; and
    decoder means for decoding an output of said frame counter means and for generating said initial value selection control signal.

5. A circuit as claimed in claim 3, wherein said initial value selector means comprises:
    multiplexing means for selecting a given initial value from a plurality of initial values generated at said initial value generator means in dependence upon said initial value selection control signal of said decoder means; and
    latch means for latching the selected initial value.

6. A circuit as claimed in claim 1, wherein said data generator means comprises:
    a first logical gate means receiving the reading control signal from said frame index pulse generator means, for shaping a first image signal read from said frame memory means;
    a second logical gate means receiving the inverted reading control signal, for shaping a second image signal read from said frame memory means, said first and second image signals being read alternatively; and
    a third logical gate means for inverting the shaped first and second image signals.

* * * * *

UNITED STATES PATENT AND TRADEMARK OFFICE
CERTIFICATE OF CORRECTION

PATENT NO. : 5,187,577
DATED : Feb. 16, 1993
INVENTOR(S) : Gi-Beom Kim

It is certified that error appears in the above-indentified patent and that said Letters Patent is hereby corrected as shown below:

| | | |
|---|---|---|
| Column 2 | Line 59, | After "and a" insert the following phrase --first and second multiplexors 203, 204. The sequential address--; |
| Column 3 | Line 34, | change "41$\ell$" to --411--; |
| | Line 36, | change "41$\ell$-1m" to --411-41m--; |
| Column 4 | Line 13, | change "(2')" to --($2^4$)--; |
| | Line 20, | change "41$\ell$" to --411--; |
| | Line 56, | after "frame" insert --index pulse generator 300. The image data shaped by the first and--: |

Signed and Sealed this

Sixth Day of June, 1995

Attest:

BRUCE LEHMAN

*Attesting Officer*  *Commissioner of Patents and Trademarks*